United States Patent
Reynolds et al.

(10) Patent No.: US 7,656,427 B2
(45) Date of Patent: Feb. 2, 2010

(54) CHARGE PUMP FOR BUS-POWERED DEVICE

(75) Inventors: Thomas Leonard Reynolds, Portland, OR (US); Jay Johnson, Grove Cove Springs, FL (US)

(73) Assignee: Electro Scientific Industries, Inc., Portland, OR (US)

( * ) Notice: Subject to any disclaimer, the term of this patent is extended or adjusted under 35 U.S.C. 154(b) by 55 days.

(21) Appl. No.: 12/138,241

(22) Filed: Jun. 12, 2008

(65) Prior Publication Data

US 2008/0238198 A1 Oct. 2, 2008

Related U.S. Application Data

(62) Division of application No. 11/176,802, filed on Jul. 6, 2005, now abandoned.

(51) Int. Cl.
*H02M 3/18* (2006.01)
*H02M 7/00* (2006.01)

(52) U.S. Cl. .................. 348/207.99; 348/370; 348/371; 348/372; 348/211.99; 307/66; 363/59

(58) Field of Classification Search .................. 363/59; 307/66; 348/207.99, 370–372, 211.99
See application file for complete search history.

(56) References Cited

U.S. PATENT DOCUMENTS

| | | | |
|---|---|---|---|
| 5,701,096 A | | 12/1997 | Higashiho |
| 5,815,386 A | * | 9/1998 | Gordon ........................ 363/50 |
| 6,178,514 B1 | * | 1/2001 | Wood .......................... 713/300 |
| 6,225,708 B1 | * | 5/2001 | Furukawa et al. ............. 307/66 |
| 6,225,755 B1 | * | 5/2001 | Shen .......................... 315/247 |
| 6,271,633 B1 | * | 8/2001 | Shen et al. ............... 315/209 R |
| 6,369,461 B1 | * | 4/2002 | Jungreis et al. ................ 307/46 |
| 6,411,531 B1 | | 6/2002 | Nork et al. |
| 6,522,357 B2 | * | 2/2003 | Beiley et al. ................. 348/296 |
| 6,756,772 B2 | | 6/2004 | McGinnis |
| 6,870,949 B2 | | 3/2005 | Baldwin |
| 7,028,126 B1 | * | 4/2006 | Liang .......................... 710/301 |
| 7,105,795 B2 | * | 9/2006 | Cartlidge et al. ........... 250/208.1 |

(Continued)

OTHER PUBLICATIONS

International Preliminary Report on Patentability, International Patent Application No. PCT/US2006/025522, dated Jan. 17, 2008, 5 pages.

(Continued)

*Primary Examiner*—Bao Q Vu
(74) *Attorney, Agent, or Firm*—Stoel Rives LLP

(57) ABSTRACT

A charge pump can be used with a bus-powered device connected to a bus. The charge pump is formed of a power connection from the bus carrying a DC power signal constrained to not exceed a given current limit and a given voltage limit, a DC-to-DC step-down voltage converter, a capacitor, and a DC-to-DC step-up voltage converter. The step-down converter has an input connected to the power connection and produces an intermediate signal having a voltage the same or less than the voltage of the power signal. The capacitor is connected to the output of the step-down converter. The step-up converter has an input connected to the output of the step-down converter and to the capacitor, and produces a final output signal having a voltage greater than the given voltage limit. The output of the step-up converter is connected to and provides DC power to the device.

7 Claims, 4 Drawing Sheets

U.S. PATENT DOCUMENTS

2003/0038670 A1* 2/2003 Li .............................. 327/536
2004/0062127 A1* 4/2004 Li .............................. 365/226
2004/0257464 A1* 12/2004 Pandit et al. ................ 348/373

OTHER PUBLICATIONS

International Search Report and Written Opinion, International Patent Application No. PCT/US2006/025522, dated Nov. 16, 2006, 9 pages.

"DC-DC Converter Basics," http://ww.powerdesigners.com/InfoWeb/design_center/articles/DC-DC/converter.shtm, Jun. 16, 2005, 12 pages.

Gibilisco (ed)., *The Illustrated Dictionary of Electronics*, 7th edition, (New York:McGraw-Hill, 1997), pp. 81 and 88.

\* cited by examiner

CHARGE PUMP FOR BUS-POWERED DEVICE

RELATED APPLICATION

This is a division of U.S. patent application Ser. No. 11/176,802, filed Jul. 6, 2005.

COPYRIGHT NOTICE

© 2005 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

The field of this disclosure relates generally but not exclusively to electronic signal bus interfaces, and more particularly, to provision of power via a bus.

BACKGROUND INFORMATION

Machine vision is useful in many applications, including reading indicia on semiconductor wafers during semiconductor manufacturing processes, as discussed in U.S. Pat. No. 6,870,949. In machine vision, there are many different types of cameras available. Camera systems include a device for image capture (like a CCD (charge-coupled device) or CMOS (complementary metal oxide semiconductor) image sensor), a conversion from analog to digital pixel data (either located inside the sensor or not) and a method for transferring the data to a processing unit. In many cameras, including those with integrated lighting, they have separate data buses from the power source. This is seen with many serial protocols because the camera unit requires a separate power connection from a power supply, typically 12 to 24 volts (V).

Development of new powered bus architectures allows for the transfer of power along with the serial data. In this, the complexity of the remote device is lower due to the lack of additional power cables and connectors. However, the voltage level and the amount of current supported is mostly inadequate for lighting applications in machine vision.

Some serial bus standards have higher voltage and current ratings, like the IEEE (Institute of Electrical and Electronic Engineers) 1394 standard, which offers significantly more power and voltage than other standards like USB (Universal Serial Bus) 2.0. In the USB standard, the voltage offered is 5 V at 500 milliamps (mA). In comparison, IEEE 1394 offers 1.5 amps (A) at 12 V.

Machine vision cameras with integrated lighting require a large source of energy at a high voltage and high repetition rate to source the integrated lights at a particular repetition or frame rate. Presently available powered serial bus architectures, which allow for low cost and high performance data transfer, do not provide the voltage or current needed to source the lighting in the integrated camera unit.

The traditional methods of charging light circuits at a higher potential are to simply raise the bus voltage to the desired potential with a "boost" element, and then connect a bank of charge storage elements to the output of the "boost" element, as shown in FIG. 1, or to use a Xenon flash tube to create a minuscule amount of charge that is raised to a very high potential (e.g., 350 V). The problems inherent in the above approaches are particularly troublesome, and prohibitive in expense of circuit board surface area, component size, system cost, and short component lifetimes.

The simple boost conversion circuit 100 in FIG. 1 has two principal problems: (1) The current budget of 500 mA allowed on the USB bus is more than exhausted in the basic operation of the switching regulator circuit; and (2) the capacitive charge support is insufficient to provide for lighting pulses extending beyond tens of microseconds. Even a moderately large "ordinary" can capacitor (10 millimeter (mm) diameter×20 mm height), which is capable of withstanding 10 V, cannot be easily obtained in values much in excess of 1000 µF (microFarads). Another problem is that because the boost factor is two in this design, approximately twice the load current is sacrificed by being switched to ground.

Xenon flash charging circuits, which are common in disposable cameras, have the problem that a tiny amount of charge raised to a very high potential will significantly degrade the lifetime of the lighting elements, as this will produce intolerable thermal spikes.

SUMMARY OF THE DISCLOSURE

According to one aspect, the invention is a charge pump for use with a bus-powered device connected to a bus. The charge pump comprises a power connection, a DC-to-DC step-down voltage converter, a capacitor, and a DC-to-DC step-up voltage converter. The power connection is from the bus for receipt of a DC power signal constrained to not exceed a given current limit and a given voltage limit. The DC-to-DC step-down voltage converter has an input and an output. The input is connected to the power connection. The step-down voltage converter produces at its output an intermediate signal having a voltage less than the voltage of the power signal. The capacitor is connected to the output of the step-down voltage converter. The DC-to-DC step-up voltage converter has an input and an output. The input of the step-up voltage converter is connected to the output of the step-down voltage converter and to the capacitor. The step-up voltage converter produces at its output a final output signal having a voltage greater than the given voltage limit. The output of the step-up voltage converter is connected to the bus-powered device and provides DC power to the device in the form of the final output signal.

According to another aspect, the invention is a method comprising receiving a power signal from a bus, storing charge from the power signal, converting the power signal to a higher voltage, thereby resulting in a boost signal, and providing the boost signal to a device connected to the bus for powering the device.

According to yet another embodiment, the invention is a bus-powered integrated camera connected to a bus. The camera comprises an imager connected to the bus and oriented to capture an image of an object to be imaged during an exposure time, an illumination source oriented to supply light on the object to be imaged during the exposure time, and a charge pump connected between the bus and the illumination source. The charge pump is substantially as described above.

Additional aspects and advantages will be apparent from the following detailed description of preferred embodiments, which proceeds with reference to the accompanying drawings.

DETAILED DESCRIPTION OF PREFERRED EMBODIMENTS

With reference to the above-listed drawings, this section describes particular embodiments and their detailed construction and operation. As one skilled in the art will appreciate in light of this disclosure, certain embodiments are capable of achieving certain advantages over the known prior art, including some or all of the following: (1) the ability to utilize a bus-powered approach for machine vision applications; (2) advantageous size, cost, and component lifetimes; and (3) more efficient illumination from a powered bus. These and other advantages of various embodiments will be apparent upon reading the remainder of this section.

Figure 1:
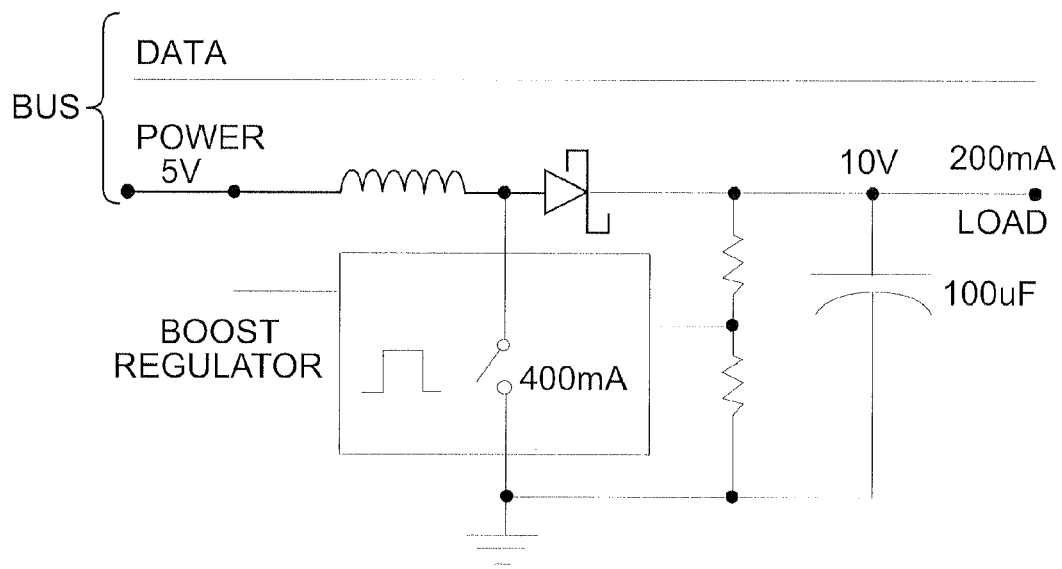
FIG. 1 is a schematic diagram of a simple boost circuit for a powered bus.
Figure 2:
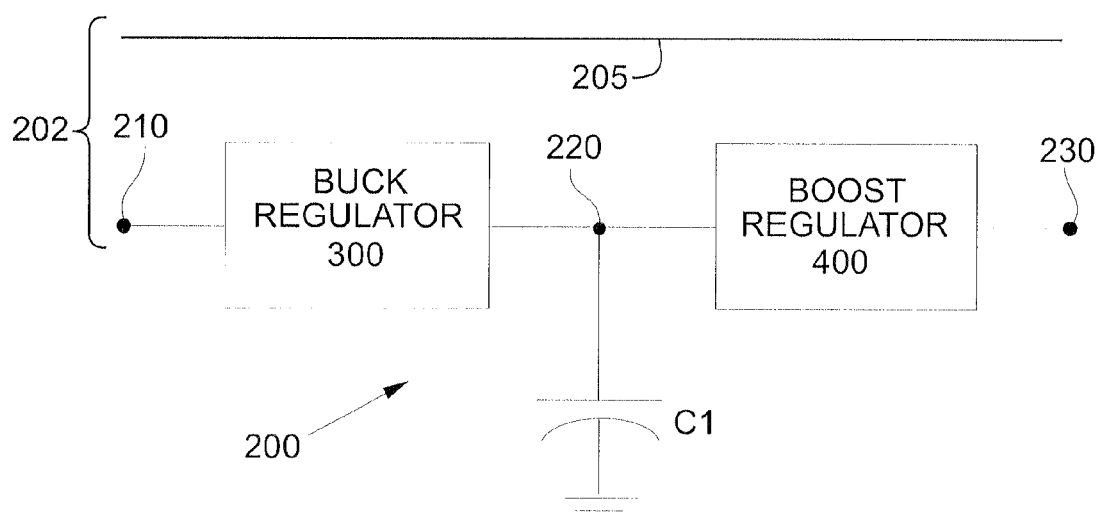
FIG. 2 is a high-level schematic diagram of a buck-boost supercap charge pump circuit, according to one embodiment.

FIG. 2 is high-level schematic diagram of a buck-boost supercap charge pump circuit 200, as part of a bus 202 comprising a power line in addition to one or more data lines 205, according to one embodiment. The circuit 200 interfaces with the power line and comprises a buck regulator 300, a capacitor C1, and a boost regulator 400. The buck regulator 300 is a DC-to-DC step-down voltage converter that converts the voltage at its input node 210 to a lower value at its output node 220. The input node 210 can be connected to a power line on a powered bus. The voltage at the node 220 charges the capacitor C1, which preferably has a capacitance on the order of 1-10 F (Farads). The charge stored in the capacitor C1 is released through the boost regulator 400, which is DC-to-DC step-up voltage converter, preferably of the switching type. The output of the boost regulator 400 is a signal on the node 230. That signal has higher voltage, at least for a limited time, than the power signal at the node 210 and can be used to provide power to a device, such as a bus-powered camera with strobe illumination.

In the case where the circuit 200 is used to provide power for strobe illumination whose power requirements are 200 mA at a voltage of 9-12 V for a period of 100 ms, then the capacitor C1 should have a fairly large capacitance value. In particular, if the boost regulator 400 draws 1 A of current, then total current draw from the capacitor is 1.2 A. Further, in (typical) cases where the boost regulator 500 does not operate well with extreme levels of voltage droop in its input signal, it is desirable to limit the input droop to a predetermined value, such as 100 mV. In this situation, the required capacitance can be computed as follows:

$$C = \frac{I*t}{\Delta V} = \frac{1.2 \text{ A} * 100 \text{ ms}}{100 \text{ mV}} = 1.2 \text{ F}$$

To provide a capacitance on this order, the capacitor C1 is preferably a "supercap," such as the Electric Double-Layer Gold Capacitor Series, from Panasonic, which are available in the 1-10 F range in modestly sized packages typically about 10 mm diameter×20 mm height.

The basic architecture of the circuit 200 is especially well suited for use in the case in which bus 202 is a USB bus. The power line of a USB bus is set to 5 V and can provide up to 500 mA of current. However, the large-capacitance capacitors that are typically required for the capacitor C1 cannot tolerate voltages that large. Typical "supercap" capacitors at the time of this writing can handle no more than a maximum of about 2.3 V. The buck regulator 300 is therefore used to step-down the bus voltage to a level suitable for application across the capacitor C1. Moreover, the 200 mA current limit of the buck regulator 300 prevents any excessive current draw on the USB bus. With a managed light pulse repetition rate, the charge that is taken during a light pulse can be restored into the capacitor C1 at a moderate rate of 200 mA, which will not impose any undue draw on the USB bus.

Figure 3:
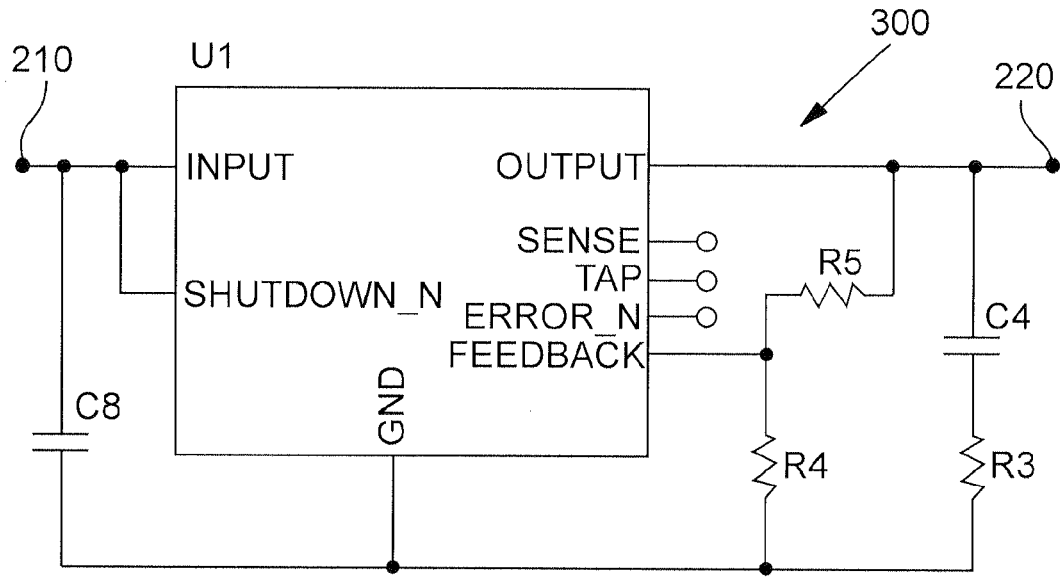
FIG. 3 is a schematic diagram of the buck voltage regulator of FIG. 2.
Figure 4:
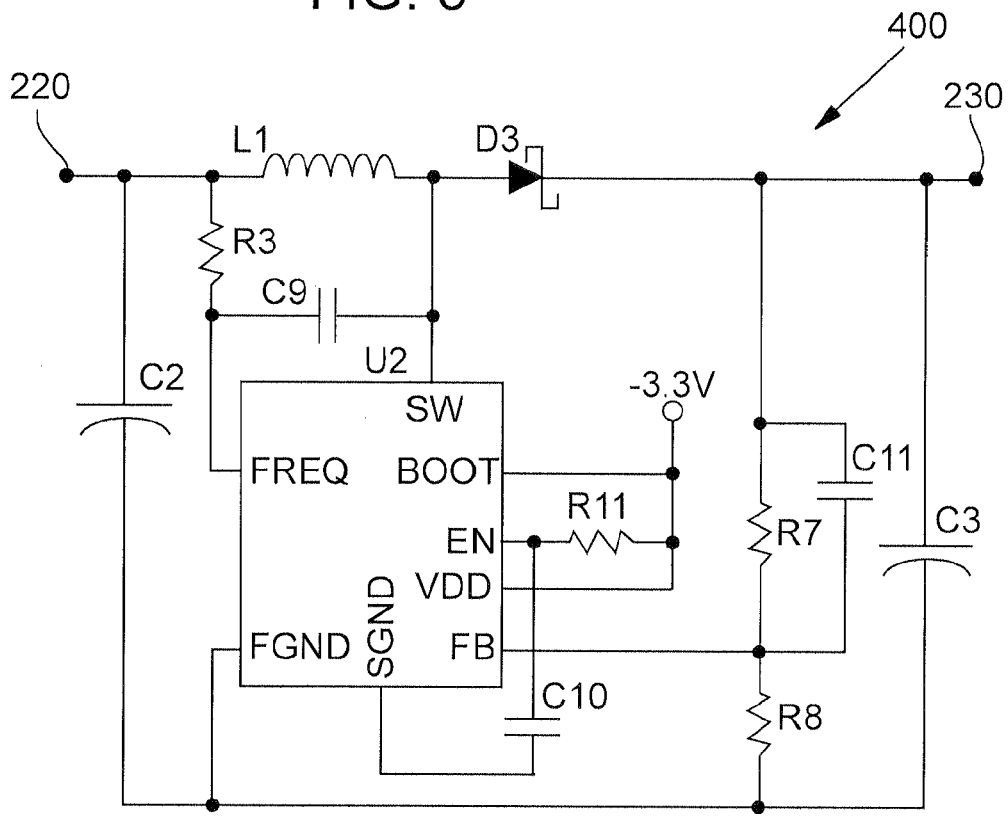
FIG. 4 is a schematic diagram of the boost voltage regulator of FIG. 2.

FIGS. 3 and 4 are schematic diagrams of particular implementations of the buck regulator 300 and the boost regulator 400, respectively. In this implementation the buck regulator 300 comprises an integrated circuit U1, resistors R3, R4, and R5, as well as capacitors C4 and C8. The integrated circuit U1 is preferably a low dropout (LDO) voltage regulator, such as a National Semiconductor 2986 ultra LDO regulator. In a, preferred version of the circuit, the capacitors C4 and C8 are 10 μF capacitors, R3 is a 1 ohm (Ω) resistor, R4 is a 51.1 KΩ (kilohm) resistor, and R5 is a 39.2 KΩ resistor. That version of the circuit converts a 5 V signal at the input node 210 to a 2.17 V signal at the intermediate node 220 and limits the current into the intermediate node 220 to no more than 200 mA. These values work well to convert a power signal from a USB bus to a signal suitable for charging a supercap.

The buck regulator 300 can also provide other features to facilitate charge storage including current limiting and protection from over-voltage to protect a charge storage device such as the capacitor C1. In other implementations, depending upon the specifications of the input signal and the requirements of the charge storage device, the buck regulator 300 can be an equivalent-voltage device (i.e., its output voltage approximately equals its input voltage), or it can be eliminated from the system all together.

The boost regulator 400 is connected to the intermediate node 220 and functions to boost the voltage across the capacitor C1 from a lower voltage to a higher voltage at the output node 230. As shown in FIG. 4, one form of the boost regulator 400 comprises an integrated circuit U2, an inductor L1, a Schottky diode D3, resistors R7, R8, R9 and R11, as well as capacitors C2, C3, C9, C10, and C11. The integrated circuit U2 is preferably a National Semiconductor LM2623 gated-oscillator-based boost DC-to-DC converter.

The values of the components of the boost regulator 400 can be chosen to satisfy given operational requirements, including those of the charge storage device connected to the intermediate node 220 and those of the device to be powered at the output node 230. For the case in which the buck regulator 300 has the values detailed above and in which the device to be powered requires 200 mA of pulsed output current at approximately 11 V, then the following analysis guides the selection of component values for the boost regulator 300.

The duty cycle of the switching boost regulator 400 at light loads is defined roughly by the ratio of output to input voltages, with considerations for the voltage drop (approximately 0.5 V) across the Schottky diode D3, as follows:

$$D_{OFF}=V_{IN}/(1.05*(V_{OUT}+0.5))=2/(1.05*(10.9+0.5))= 0.167.$$

$$D_{ON}=1-D_{OFF}=0.833.$$

The average inductor current is proportional to the duty cycle, as follows:

$$I_{L(AVG)}=(1/D_{OFF})*I_{OUT}=5.98*200 \text{ mA}=1.20 \text{ A},$$

and, the average inductor ripple current is given by the following relation:

$$\Delta i_L=(D_{ON}*V_{IN})/(2*f_{SW}*L),$$

where $f_{sw}$ is the frequency of operation. The value of L can be chosen such that $\Delta i_L$ is less than 50% of $I_{L(AVG)}$, assuming $f_{sw}$=1 MHz (megaHertz), as follows:

$$L=(D_{ON}*V_{IN})/(2*f_{SW}*\Delta i_L)=(0.833*2)/(2*10^6*0.5*1.20)=1.39 \text{ μH}.$$

A good starting point is 1.5 μH, particularly if the frequency goes down.

At low input voltages, parasitic resistive elements in the circuit can significantly affect circuit operation. In particular, the maximum current that can be moved through the inductor when the switch is closed is $I_{L(LIMIT)}=V_{IN}/R_S$. If the equivalent series resistance of the supercap is 0.3 Ω, the DC resistance of the inductor is 0.009 Ω, and the "on" resistance of the switch $R_{DS}$=0.09 Ω, then $R_S$ can be estimated conservatively as 0.4 Ω. Then the maximum inductor short-circuit current is $I_{L(LIMIT)}$=2 V/0.4 Ω=5 A. The peak inductor current can be calculated as $$I_{L(PEAK)}=I_{L(AVG)}+\Delta i_L/2=1.2 \text{ A}+0.46*1.2 \text{ A}/2=1.467 \text{ A},$$

which is well under $I_{L(LIMIT)}$, even if the frequency goes down, or the inductance goes down.

The charge stored on the capacitor C1, when fully charged, is given by $$Q=C*V=4.7 \text{ F}*2.17 \text{ V}=10.1 \text{ C (Coulombs)}.$$

In this case, the first LDO regulator has a 200 mA current limit, which will charge the capacitor C1 in the following time: t=Q/I=10.1/0.2=50.5 s (seconds). Maximum light current in this case is 200 mA. Because the circuit operates at a high duty cycle, most of the charge taken from the capacitor C1 is spilled to ground through the switch in the boost regulator 400. The portion taken directly by the load is:

$$\Delta Q_{LOAD}=I*t=0.2 \text{ A}*33 \text{ ms}=6.6 \text{ mC}.$$

The portion dumped through the switch is:

$$\Delta Q_{SW}=\Delta Q_{LOAD}(D_{ON}/D_{OFF})=6.6 \text{ mC}*0.833/0.167=33 \text{ mC}.$$

The total charge taken from the supercap per pulse is then:

$$\Delta Q_{TOTAL}=\Delta Q_{LOAD}+\Delta Q_{SW}=6.6 \text{ mC}+33 \text{ mC}\approx 40 \text{ mC}.$$

In 330 ms (the minimum inactive period), the circuit 200 can recover 0.2*0.33 mC=66 mC of charge. This allows for a positive charge cycle that has a design margin for allowing the capacitor C1 to have room to fully charge under maximum conditions.

According to the prior analysis, the capacitor C1 when fully charged contains 10.1 Coulombs. If the circuit 200 consumes just 40 mC, that is just 0.4% of the total charge. Since Q=C*V, and C remains constant, as Q diminishes by 0.4%, so does V, for a droop of approximately 7 mV. This is within the specifications of the circuit for maximum voltage droop.

Figure 5:
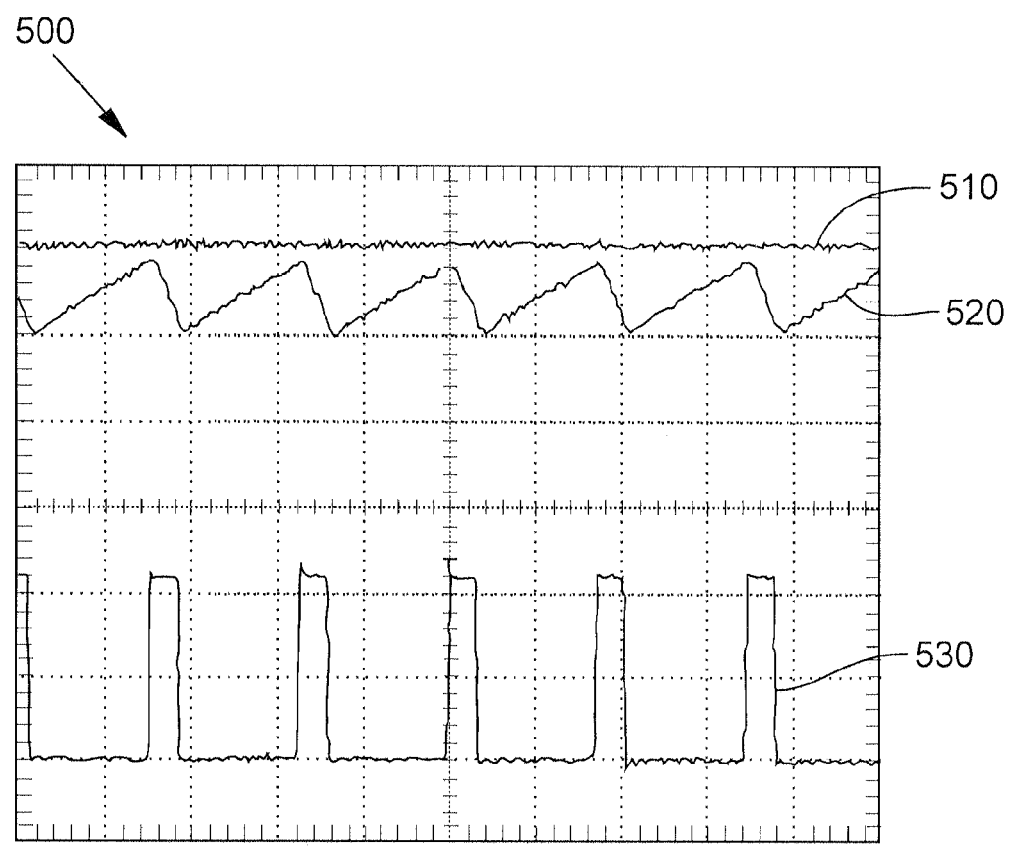
FIG. 5 is a plot of voltage waveforms from the circuit of FIG. 2.

The circuit 200 was implemented and tested supplying power to an integrated light system and camera from a USB bus. FIG. 5 is a plot 500 of waveforms from that circuit, showing the output voltage waveform 510, inductor current waveform 520, and switch node waveform 530. The output voltage waveform 510 is shown to be holding at approximately 10.8 V. The inductor current waveform 520 ripples at 1.8*$V_{OUT}$. FIG. 5 is a plot of voltage waveforms from the circuit of FIG. 3 with an average level of 6*$V_{OUT}$. The switch node waveform 530 shows that the duty cycle is about 83.3%.

Thus, the circuit 200 is a charge boost system that can increase a bus power voltage from a nominal 5 volts (in the case of USB) to a higher voltage, with support for substantial current. In cases where the power is supplied for the purpose of illumination, this increase in voltage allows for more LEDs to be placed in series (also called "strings") to better utilize the current for illumination. Because there is a higher potential on the string, more LEDs can be placed, allowing a given amount of charge to do more work, and reducing losses caused by thermal dissipation. In a preferred application, a set of 24 LEDs is fired simultaneously. The set of LEDs is arranged in one or more rings around the camera to illuminate a semiconductor wafer during the camera's exposure time for machine vision. The ring(s) has six strings, each with four LEDs per string. Each string draws approximately 33 mA, so the total current draw for the ring is approximately 200 mA.

The circuit 200 effectively uses a remote energy storage device to store energy required to fire remote lights. Since the exposure time of a camera is small, typically tens of milliseconds, the amount of time required by the lights to be on is on the same order of magnitude. To increase the output of the lights, one wants the current of the system to be as high as possible for the exposure time of the camera. In the circuit 200, the average current draw is low and is kept under the overall current limit of the powered serial bus (in the case of USB is 500 mA), but the peak current draw for the exposure time of the camera is high. The use of an energy storage device also requires charging of the system between strobes and implementing a system that allows for high peak currents and a high enough frame rate for the application while staying within the limits of the bus power specification.

Those skilled in the art will therefore appreciate, in light of the teachings set forth herein, that the circuit 200 is well suited for powering an integrated machine vision camera with integrated lights driven by the USB 2.0 powered serial bus. This technique can be extended to other powered bus architectures including IEEE 1394 in applications where the needs of more current and energy are required. Also note that the power can be supplied by a computer in which the bus host is located or by another device, such as a powered hub.

Figure 6:
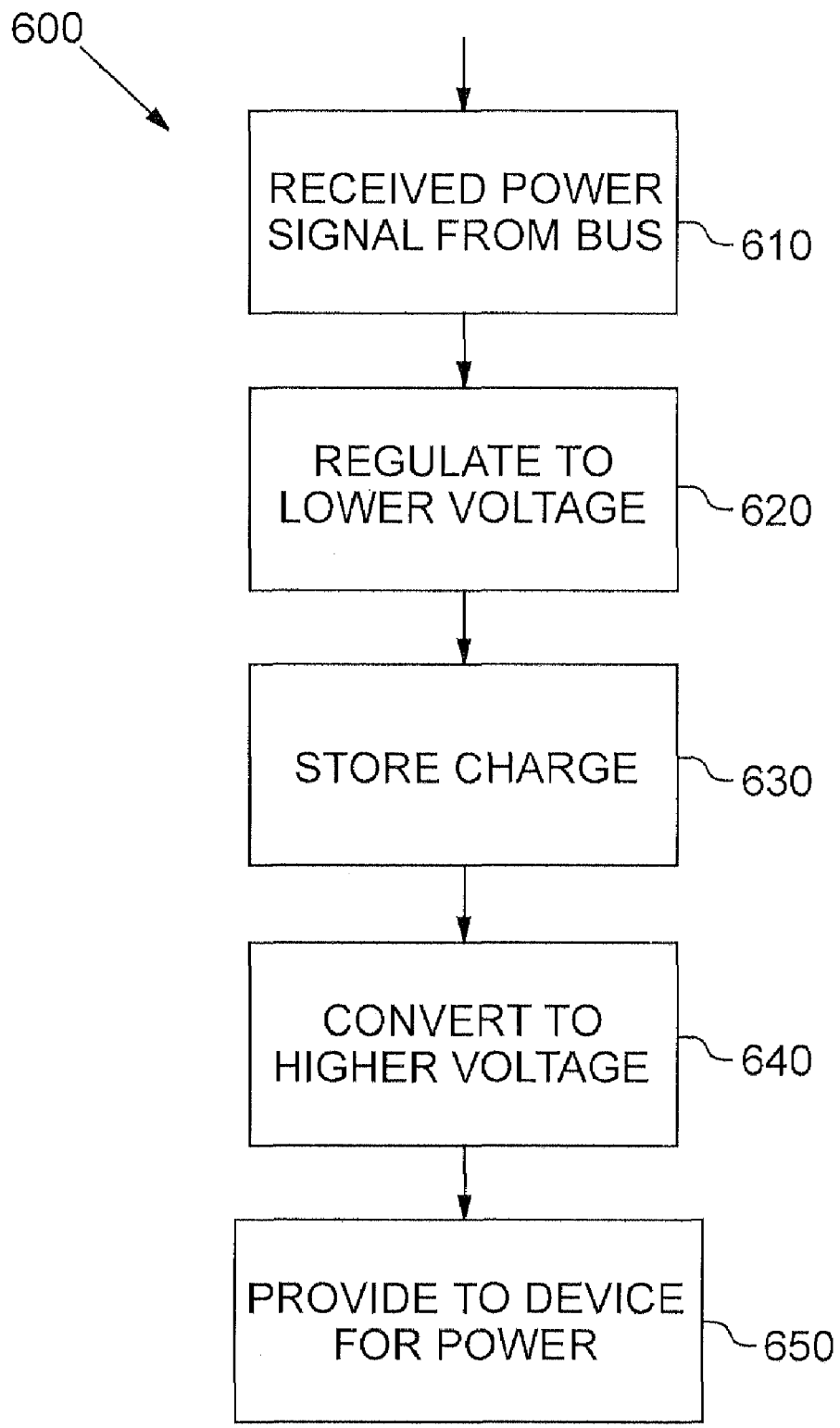
FIG. 6 is a flowchart of a method according to one embodiment.

FIG. 6 is a flowchart of a method 600 according to one embodiment. The method 600 begins by receiving (610) a power signal from a bus, which may be any type of bus, typically a powered serial bus such as a USB-compliant bus or an IEEE 1394-compliant bus. The entire bus signal or just the power connection from the bus may be received. Structure for performing the receiving step 610 include, for example, bus ports, bus input interfaces, or simply a connection from the power pin(s) or power wire(s) from a bus. The method 600 next regulates (620) the voltage of the power signal to a lower potential. The regulating step 620 may be as simple as a voltage step-down conversion or may be more elaborate. One illustrative structure for performing the regulating step 600 is the buck regulator 300 described above. The method 600 stores (630) charge from the lower voltage signal (i.e., "buck" signal) that results from the regulating step 620. The preferred means for storing charge is a capacitor, most preferably a supercap at the time of this writing. Other charge storage devices may be utilized instead. The method 600 then converts (640) to a higher potential the lower voltage signal that results from the regulating step 620 and that supplies the charge for storage. The converting step 640 can be as simple as a step-up or "boost" voltage conversion or may be more elaborate. One illustrative structure for performing the converting step 640 is the boost regulator 400 described above. The result of the converting step 640 can be referred to as a "buck-boost" signal. Finally, the method 600 provides (650) the buck-boost signal to a device connected to the bus for powering the device. Means for providing the buck-boost signal may be an electrical connection to the device sufficient to carry the power to the device. The device may be any type of device but in a presently preferred embodiment is a strobe illumination device or a combination of a camera with integrated strobe illumination, such as may be used for machine vision applications, especially the imaging of indicia on a semiconductor wafer during its processing.

The terms and descriptions used above are set forth by way of illustration only and are not meant as limitations. Those skilled in the art will recognize that many variations can be made to the details of the above-described embodiments without departing from the underlying principles of the invention. The scope of the invention should therefore be determined only by the following claims—and their equivalents—in which all terms are to be understood in their broadest reasonable sense unless otherwise indicated.

The invention claimed is:

1. A method of using a powered bi-directional serial bus to convey, from an origin to a destination remotely located from the origin, a source amount of electrical power for conditioning at the destination to operate at a high repetition rate an illumination source of a camera capturing a series of images of a scene, and to convey, from the destination to the origin, image data representing the series of captured images of the scene, comprising:

conveying on the serial bus from the origin to the remotely located destination a source amount of electrical power set at or below an overall electrical power capacity limit of the serial bus;

providing a camera comprising an illumination source and an imager, the illumination source oriented to illuminate a scene and the imager oriented to capture images of the scene;

conditioning the source amount of electrical power received at the destination to generate for application to the illumination source spaced-apart peak electrical power pulses that produce high intensity lighting pulses occurring at highly repetitive times of exposure and that define an average power, the peak electrical power pulses exceeding and the average power remaining below the overall electrical power capacity limit of the serial bus;

causing the imager during the highly repetitive times of exposure to capture images of the scene; and in response to the capture of images, conveying on the serial bus for delivery, from the destination to the origin, data representing the captured images of the scene, thereby to achieve, with use of a limited electrical power capacity serial bus, supply of electrical power for high intensity camera lighting along with capture and transfer of image data.

2. The method of claim 1, in which the illumination source includes multiple light-emitting diodes.

3. The method of claim 1, in which the conditioning of the source amount of electrical power includes using an electrical charge pump that is connected between the serial bus and the illumination source and comprises an electrical charge storage device and one or more DC to DC voltage converters.

4. The method of claim 1, in which the powered bidirectional serial bus is implemented in a machine vision system.

5. The method of claim 1, in which the captured images of the scene are those of a semiconductor device.

6. The method of claim 1, in which the illumination source constitutes a strobe illumination device that is an integral part of the camera.

7. The method of claim 1, in which the serial bus is of a USB type.

* * * * *